United States Patent
Shin et al.

(10) Patent No.: US 8,144,670 B2
(45) Date of Patent: Mar. 27, 2012

(54) CHANNEL ALLOCATION MANAGEMENT METHOD FOR TRANSFERRING UNCOMPRESSED ISOCHRONOUS DATA, UNCOMPRESSED ISOCHRONOUS DATA TRANSFERRING METHOD AND APPARATUS THEREOF

(75) Inventors: Se-young Shin, Suwon-si (KR); Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 11/755,937

(22) Filed: May 31, 2007

(65) Prior Publication Data

US 2007/0280237 A1    Dec. 6, 2007

(30) Foreign Application Priority Data

Jun. 5, 2006    (KR) .................. 10-2006-0050510
Mar. 14, 2007    (KR) .................. 10-2007-0025149

(51) Int. Cl.
*H04J 3/00* (2006.01)

(52) U.S. Cl. ......... 370/336; 370/229; 370/432; 370/349

(58) Field of Classification Search .................. 370/349, 370/329, 328, 218, 229, 432, 336
See application file for complete search history.

(56) References Cited

U.S. PATENT DOCUMENTS

| | | | |
|---|---|---|---|
| 6,879,579 | B1 | 4/2005 | Myles et al. |
| 6,928,085 | B2 | 8/2005 | Haartsen |
| 6,992,987 | B2 | 1/2006 | Kobayashi |
| 7,965,837 | B2 | 6/2011 | Kawasaki et al. |
| 2003/0152059 | A1 | 8/2003 | Odman |

FOREIGN PATENT DOCUMENTS

| | | |
|---|---|---|
| JP | 2005050304 A | 2/2005 |
| JP | 2006525736 A | 11/2006 |
| KR | 10-2005-0003575 A | 1/2005 |
| KR | 2005-0028737 A | 3/2005 |
| WO | 2004100438 A2 | 11/2004 |

OTHER PUBLICATIONS

IEEE Standard for Information technology—Telecommunications and information exchange between systems—Local and metropolitan area networks—Specific requirements Part 15.3: Wireless Medium Access Control (MAC) and Physical Layer (PHY) Specifications for High Rate Wireless Personal Area Networks (WPANs), Published on Sep. 29, 2003.*
Japanese Office Action dated Jul. 19, 2011 in the corresponding Japanese Patent Application No. 2009-513065.
Communication dated Dec. 6, 2011 issued by the Japanese Patent Office in counterpart Japanese Patent Application No. 2009-513065.
Communication dated Nov. 10, 2011 issued by the State Intellectual Property Office of P.R. China in counterpart Chinese Patent Application No. 200780016538.X.

* cited by examiner

*Primary Examiner* — Kent Chang
*Assistant Examiner* — Ronald Eisner
(74) *Attorney, Agent, or Firm* — Sughrue Mion, PLLC

(57) ABSTRACT

A method of managing channel allocation for uncompressed isochronous data transmission includes broadcasting a first superframe for a first beacon period, the first superframe containing a control section and a data slot section; receiving a request frame from at least one wireless device belonging to a network via the control section, the request frame requesting addition of a data slot for uncompressed isochronous data transmission; transmitting a response frame to the at least one wireless device via the control section in response to the request frame; and broadcasting a second superframe for a second beacon period, the second superframe containing the data slot added to the at least one wireless device.

31 Claims, 11 Drawing Sheets

FIG. 5a

| Stream index | Stream request ID | Min_BW | Number of time blocks | Time block duration | BWRateType | BWRateFactor | Priority |
|---|---|---|---|---|---|---|---|
| 51 | 52 | 53 | 54 | 55 | 56 | 57 | 58 |

FIG. 5b

| TrgtID | Stream request ID | Stream index | Number of time blocks | Time block duration | Minimum Schedule period | Maximum Schedule period | Request control |
|---|---|---|---|---|---|---|---|
| 50a | 51a | 52a | 53a | 54a | 55a | 56a | 57a |

FIG. 6

| MAC HEADER | PAYLOAD | | | | | |
|---|---|---|---|---|---|---|
| | FRAME TYPE | LENGTH | BWRp-1 | BWRp-2 | ...... | BWRp-n |
| 20 | 61 | 62 | 63 | 64 | | 65 |

60 / 30

CHANNEL ALLOCATION MANAGEMENT METHOD FOR TRANSFERRING UNCOMPRESSED ISOCHRONOUS DATA, UNCOMPRESSED ISOCHRONOUS DATA TRANSFERRING METHOD AND APPARATUS THEREOF

This application claims priority from Korean Patent Application Nos. 10-2006-0050510 and 10-2007-0025149 filed on Jun. 5, 2006 and Mar. 14, 2007, respectively, in the Korean Intellectual Property Office, the disclosures of which are incorporated herein by reference in its entirety.

BACKGROUND OF THE INVENTION

1. Field of the Invention

Methods and apparatuses consistent with the present invention relate generally to wireless communication technology, and more particularly, to ensuring efficient and stable data transmission when large-capacity uncompressed isochronous data is transmitted wirelessly.

2. Description of the Related Art

As generally known in the related art, networks tend to be used on a wireless basis, and the request for large-capacity multimedia data transmission is ever-increasing. As a result, it is necessary to provide an efficient transmission method in wireless network environments. Considering the characteristics of wireless networks, in which different devices share and use given wireless resources, increased competition may cause collision during communication, which results in the loss of a large amount of data. This means that valuable wireless resources may be wasted. In order to reduce such collision or loss and guarantee stable data transmission/reception, it is customary to use a competition-based Distributed Coordination Function (DCF) or an uncompetitive Point Coordination Function (PCG) in wireless Local Area Network (LAN) environments and to use a type of time division, particularly channel time allocation, in wireless Personal Area Network (PAN) environments.

Although these methods may lessen collision and ensure stable communication to some degree when applied to wireless networks, the possibility that collision between transmitted data will occur is still higher than in the case of wired networks. This is because wireless network environments essentially have a large number of factors adversely affecting stable communication, such as multi-path properties, fading, and interference. In addition, the more wireless networks participate, the higher the possibility of problems (e.g., collision, loss) becomes.

Such collision requires retransmission, which fatally affects the throughput of wireless networks. Particularly, in the case of Audio/Video (AV) data requiring a higher level of Quality of Service (QoS), it is a crucial issue to reduce the number of retransmissions and secure more bandwidth.

Considering the current trend of requesting wireless transmission of high-quality video, such as Digital Video Disk (DVD) images or High Definition Television (HDTV) between various home devices, there is now a need to provide technological standards for seamlessly transmitting/receiving high-quality video.

A task group under IEEE 802.15.3c is preparing a technological standard for transmitting large-capacity data in wireless home networks. This standard, commonly referred to as Millimeter Wave (mmWave), uses radio waves having millimeter-grade physical wavelengths (i.e., radio waves having a frequency of 30-300 GHz) for large-capacity data transmission. Such a frequency domain has conventionally been used as an unlicensed band in limited applications, e.g., for communication business providers, for the purpose of radio-wave astronomy or vehicle collision prevention, etc.

FIG. 1 shows a comparison between a frequency band based on an IEEE 802.11 series standard and one based on mmWave. It is clear from the drawing that IEEE 802.11b or IEEE 802.11g uses a band of 2.4 GHz and a channel bandwidth of about 20 MHz. In addition, IEEE 802.11a or IEEE 802.11n uses a band of 5 GHz and a channel bandwidth of about 20 MHz. In contrast, mmWave uses a band of 60 GHz and a channel bandwidth of about 0.5-2.5 GHz. This means that mmWave has a much larger frequency band and a smaller channel bandwidth compared with conventional IEEE 802.11 series standards.

As such, use of a high-frequency signal having a millimeter-grade wavelength (i.e., millimeter wave) guarantees that the transmission rate reaches the level of tens of Gbps and that the antenna has a size less than 1.5 mm. This means that a single chip incorporating an antenna can be implemented. In addition, a very high attenuation ratio in the air reduces interference between devices.

However, considering that the high attenuation ratio shortens the reach and that signals tend to propagate straightforward, proper communication can hardly be ensured in non-line-of-sight environments. Therefore, mmWave proposes that the former problem be solved by using an array antenna having high gain and the latter problem by a beam steering scheme.

In addition to technology for transmitting compressed data by using a band of tends of Gbps based on conventional IEEE 802.11 series in home or office environments, it has recently been proposed to transmit uncompressed data by using a millimeter wave in a high-frequency band of tens of Gbps. As used herein, uncompressed data refers to data which is not compressed in terms of loss encoding. This means that lossless encoding may be employed as long as complete restoration is guaranteed.

Particularly, uncompressed AV data is large-capacity data which has not been compressed, and cannot be transmitted but in a high-frequency band of tens of Gbps. Compared with compressed data, uncompressed AV data hardly affects the display even if there is a packet loss. This means that Automatic Repeat Request (ARQ) or retry is unnecessary. Therefore, it is requested to provide a method for ensuring efficient medium access so as to properly transmit uncompressed data in a high-frequency band (tens of Gbps) having the above-mentioned characteristics.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for managing channel allocation, such as adding, changing, or returning a channel for transmitting uncompressed isochronous data by using a millimeter wave in a band of tens of GHz, a management method regarding the allocation, a method for efficiently transmitting uncompressed data, and apparatuses for implementing the methods.

In addition, the present invention provides a frame ensuring flexibility in channel allocation for uncompressed isochronous data transmission.

Further to the above aspect, the present invention has additional technical aspects not described above, which can be clearly understood by those skilled in the art from the following description.

In accordance with one aspect of the present invention, there is provided a method of managing channel allocation for uncompressed isochronous data transmission, the method including broadcasting a first superframe for a first beacon period, the first superframe containing a control section and a data slot section; receiving a request frame from at least one wireless device belonging to a network via the control section, the request frame requesting addition of a data slot for uncompressed isochronous data transmission; transmitting a response frame to the at least one wireless device via the control section in response to the request frame; and broadcasting a second superframe for a second beacon period, the second superframe containing information regarding a data slot added to the at least one wireless device.

In accordance with another aspect of the present invention, there is provided a method of managing channel allocation for uncompressed isochronous data transmission, the method including broadcasting a first superframe for a first beacon period, the first superframe containing a control section and a data slot section; receiving a request frame from at least one wireless device belonging to a network via the control section, the request frame requesting change of a data slot for uncompressed isochronous data transmission; transmitting a response frame to the at least one wireless device via the control section in response to the request frame; and broadcasting a second superframe for a second beacon period, the second superframe containing information regarding the data slot changed as requested by the at least one wireless device.

In accordance with another aspect of the present invention, there is provided a method of managing channel allocation for uncompressed isochronous data transmission, the method including broadcasting a first superframe for a first beacon period, the first superframe containing a control section and a data slot section; receiving a request frame from at least one wireless device belonging to a network via the control section, the request frame requesting return of a data slot for uncompressed isochronous data transmission; and broadcasting a second superframe for a second beacon period, the second superframe containing information regarding the data slot returned to the at least one wireless device.

In accordance with another aspect of the present invention, there is provided a method of transmitting uncompressed isochronous data, the method including receiving a first superframe from a network coordinator for a first beacon period, the first superframe containing a control section and a data slot section; transmitting a request frame to the network coordinator within the control section, the request frame requesting addition of a data slot for transmission of uncompressed isochronous data; receiving a second superframe from the network coordinator for a second beacon period, the second superframe containing information regarding an added data slot; and transmitting corresponding uncompressed isochronous data to a wireless device via the added data slot section.

In accordance with another aspect of the present invention, there is provided a method of managing channel allocation for uncompressed isochronous data transmission, the method including broadcasting a first superframe for a first beacon period, the first superframe containing a control section and a data slot section; receiving a request frame from at least one wireless device belonging to a network via the control section, the request frame requesting change of a data slot for uncompressed isochronous data transmission; transmitting a response frame to the at least one wireless device via the control section in response to the request frame; and broadcasting a second superframe for a second beacon period, the second superframe containing information regarding the data slot changed as requested by the at least one wireless device.

In accordance with another aspect of the present invention, there is provided a method of transmitting uncompressed isochronous data, the method including receiving a request frame from at least one device connected to a network via a first beacon section, the request frame requesting isochronous data transmission; transmitting a response frame to the device connected to the network in response to the request frame; and transmitting uncompressed isochronous data to the device connected to the network based on the response frame.

In accordance with another aspect of the present invention, there is provided an apparatus for allocating a data slot for uncompressed isochronous data transmission, the apparatus including a unit broadcasting a fist superframe for a first beacon period, the first superframe containing a control section and a data slot section; a unit receiving a frame from at least one wireless device belonging to a network within the control section, the frame requesting addition of a data slot for uncompressed isochronous data transmission; a unit transmitting a response frame to the at least one wireless device within the control section in response to the frame; and a unit broadcasting a second superframe for a second beacon period, the second superframe containing information regarding the data slot added to the at least one wireless device.

In accordance with another aspect of the present invention, there is provided an apparatus for allocating a data slot for uncompressed isochronous data transmission, the apparatus including a unit broadcasting a first superframe for a first beacon period, the first superframe containing a control section and a data slot section; a unit receiving a frame from at least one wireless device belonging to a network within the control section, the frame requesting change of a data slot for uncompressed isochronous data transmission; a unit transmitting a response frame to the at least one wireless device within the control section in response to the frame; and a unit broadcasting a second superframe for a second beacon period, the second superframe containing information regarding the data slot changed as requested by the at least one wireless device.

In accordance with another aspect of the present invention, there is provided an apparatus for allocating a data slot for uncompressed isochronous data transmission, the apparatus including a unit broadcasting a first superframe for a first beacon period, the first superframe containing a control section and a data slot section; a unit receiving a frame from at least one wireless device belonging to a network within the control section, the frame requesting return of a data slot for uncompressed isochronous data transmission; a unit transmitting a response frame to the at least one wireless device within the control section in response to the frame; and a unit broadcasting a second superframe for a second beacon period, the second superframe containing information regarding the data slot returned to the at least one wireless device.

In accordance with another aspect of the present invention, there is provided an apparatus for transmitting uncompressed isochronous data, the apparatus including a unit receiving a first superframe from a network coordinator for a first beacon period, the first superframe containing a control section and a data slot section; a unit transmitting a frame to the network coordinator within the control section contained in the first superframe, the frame requesting addition of a data slot for uncompressed isochronous data transmission; a unit receiving a second superframe from the network coordinator for a second beacon period, the second superframe containing information regarding the added data slot, and a unit transmitting uncompressed isochronous data to a wireless device via the added data slot section.

In accordance with another aspect of the present invention, there is provided an apparatus for transmitting uncompressed isochronous data, the apparatus including a unit receiving a first superframe from a network coordinator for a first beacon period, the first superframe containing a control section and a data slot section; a unit transmitting a frame to the network coordinator within the control section contained in the first superframe, the frame requesting change of a data slot for uncompressed isochronous data transmission; a unit receiving a second superframe from the network coordinator for a second beacon period, the second superframe containing information regarding the changed data slot, and a unit transmitting uncompressed isochronous data to a wireless device via the changed data slot section.

BRIEF DESCRIPTION OF THE DRAWINGS

The above and other aspects of the present invention will be more apparent from the following detailed description of exemplary embodiments taken in conjunction with the accompanying drawings, in which:

FIGS. 4, 5a, and 5b show the construction of data slot management slots according to exemplary embodiments of the present invention, respectively;

FIGS. 6, 7a, and 7b show the construction of response frames responding to data slot management frames according to exemplary embodiments of the present invention, respectively;

DETAILED DESCRIPTION OF EXEMPLARY EMBODIMENTS OF THE INVENTION

Figure 1:
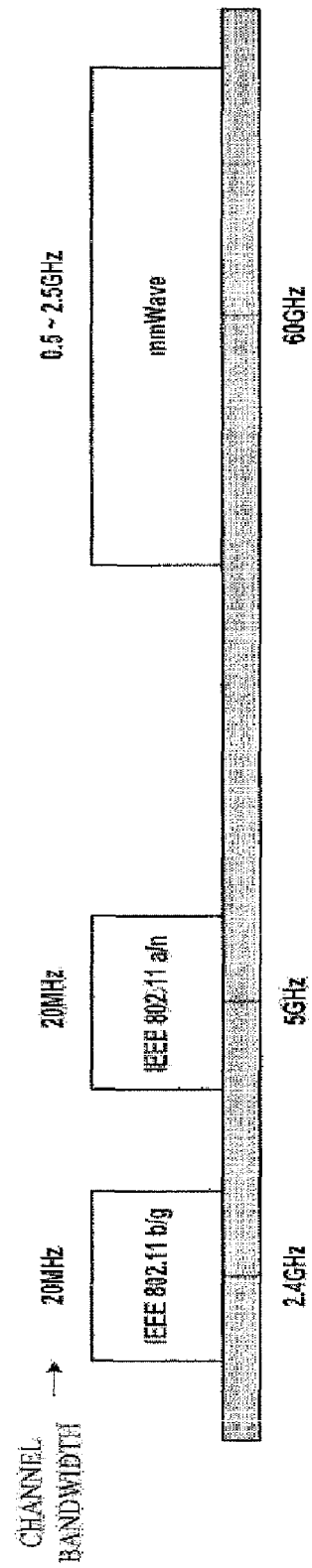
FIG. 1 shows a comparison between a frequency band based on an IEEE 802.11 series standard and that based on mmWave.

Advantages and features of the present invention, and ways to achieve them will be apparent from exemplary embodiments of the present invention as will be described below together with the accompanying drawings. However, the scope of the present invention is not limited to such exemplary embodiments and the present invention may be realized in various forms. The exemplary embodiments to be described below are nothing but the ones provided to bring the disclosure of the present invention to perfection and assist those skilled in the art to completely understand the present invention. The present invention is defined only by the scope of the appended claims. Also, the same reference numerals are used to designate the same elements throughout the specification.

The present invention is described hereinafter with reference to block diagrams or flowcharts for illustrating a channel allocation management method for uncompressed isochronous data transmission, an uncompressed isochronous data transmission method, and apparatuses for implementing the methods according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Hereinafter, exemplary embodiments of the present invention will be described with reference to the accompanying drawings.

Figure 2A:
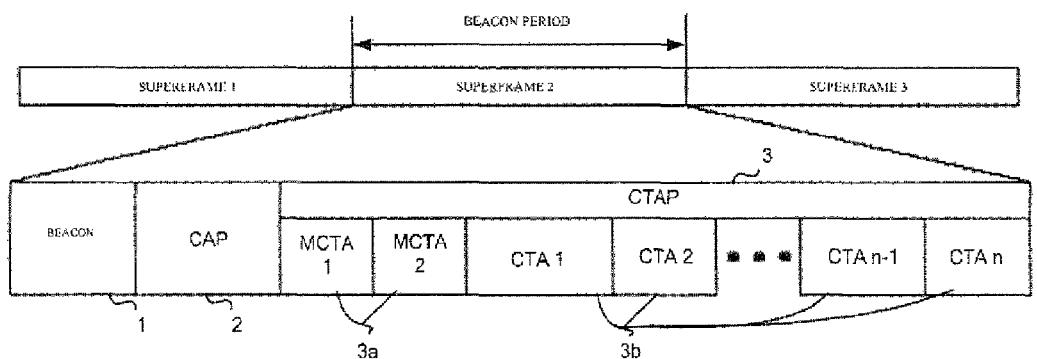
FIG. 2a shows a time division scheme based on IEEE 802.15.3.
Figure 2B:
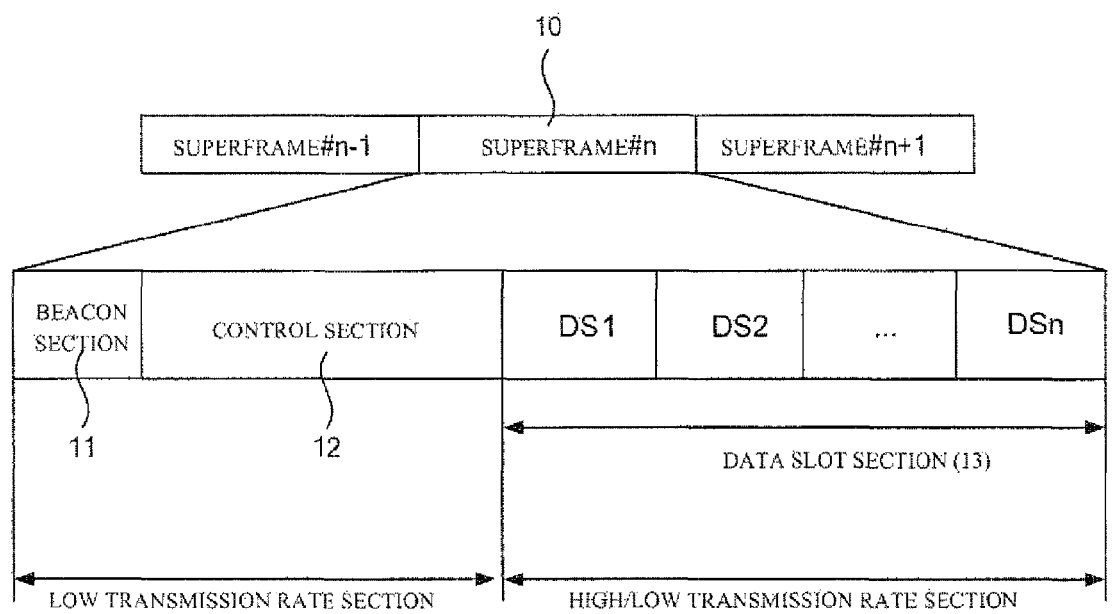
FIG. 2b shows a time division scheme according to an exemplary embodiment of the present invention.

The time division scheme according to the present invention is based on a time division scheme defined by IEEE 802.15.3 standards. FIG. 2a shows a conventional time division scheme based on IEEE 802.15.3, and FIG. 2b shows a time division scheme according to the present invention.

Medium Access Control (MAC) defined by IEEE 802.15.3 is characterized in that it can quickly establish a wireless network and that it is not based on an Access Point (AP), but an ad hoc network, also referred to as a piconet, which has a PNC (Piconet Coordinator) as a key component. In a time-based arrangement structure shown in FIG. 2a, which is called a superframe, time sections for transmitting/receiving data between devices are arranged. The superframe includes a beacon section 1 containing control information, a Contention Access Period (CAP) section 2 for transmitting data by using backoff, and a Channel Time Allocation Period (CTAP)

section 3 for transmitting data without competition for an allocated period of time. Both CAP 2 and Management Channel Time Allocation (MCTA) 3a adopt a competitive access scheme. Particularly, the CAP 2 adopts a Carrier Sense Multiple Access/Collision Avoidance (CSMA/CA) scheme, and the MCTA adopts a slotted aloha scheme.

The CTAP 3 includes a number of CTAs (Channel Time Allocations) 3b in addition to the MCTA 3a. The CTAs 3b have two types: a dynamic CTA and a pseudo-static CTA. The dynamic CTA may vary its location in every superframe and, once the beacon is lost, the CTA cannot be used in the corresponding superframe. In contrast, the pseudo-static CTA remains fixed at the same location and, even if the beacon is lost, the CTA section can be used at the fixed location. However, if the beacon is lost a consecutive number of times corresponding to 'mMaxLostBeacons,' the CTA section is not allowed to be used, even in the case of the pseudo-static CTA.

As such, MAC following IEEE 802.15.3 is based on Time Division Multiple Access (TDMA), which guarantees stable QoS, and is particularly suited to multimedia AV streaming in home networks. However, there is still room for improvement in order to transmit AV data in a high-frequency band of tens of GHz.

In general, MAC frames transmitted/received between devices in a network include a data frame and a control frame.

The control frame refers to any type of frame for aiding transmission of the data frame, but not the data fame itself. For example, the control frame includes an association request frame for requesting participation in a network established by a network coordinator, a data slot request frame for requesting a data slot for transmitting isochronous data, a probe request frame for requesting a network search, a coordinator handover request frame for handing over the role of a coordinator, and frames for responding to these frames. The control fame also includes an acknowledgement (ACK) frame for acknowledging that a frame has been properly transmitted.

However, in the case of IEEE 802.15.3, the size of a data frame does not greatly differ from that of a control frame. Particularly, the data frame has a maximum size of 2048 bytes, and the control frame has a size of tens or hundreds of bytes. However, in order to transmit uncompressed isochronous data in a band of tens of GHz, the data frame size increases to a large extent while the control frame size remains the same. As a result, it is inefficient to follow the conventional IEEE 802.15.3 scheme shown in FIG. 2a without modification.

In the case of a conventional CAP 2 and an MCTA 3a based on IEEE 802.15.3, various control frames and asynchronous data frames competitively access the channel. This means that, if asynchronous data frames of lesser importance obtain the channel more frequently, the chance to transmit control frames necessary for transmission of uncompressed isochronous data decreases.

In addition, uncompressed isochronous data requires channel allocation management, such as allocating additional channels based on the condition of transmission channels or that of wireless devices transmitting uncompressed isochronous data (addition of data slots), changing existing channels (change of data slots), or returning already allocated channels (return of data slots). However, the conventional IEEE 802.15.3 structure shown in FIG. 2a is not adapted for such channel allocation management.

FIG. 2b shows a time-based arrangement structure for the above-mentioned channel allocation management (addition, change, and return of data slots), i.e., a superframe 10.

The superframe 10 includes a beacon section 11 for transmitting a beacon frame containing control information, a control section 12, via which various control frames are transmitted competitively, and a data slot section 13 for transmitting uncompressed isochronous data without competition for an allocated period of time. The control section 12 may follow a CSMA/CA scheme or a slotted aloha scheme.

The data slot section 13 includes a number of data slots DS1, DS2, ..., DSn. As in the case of conventional superframes, the data slots have two types: dynamic data slots and pseudo-static data slots.

The control section 12 is used to transmit/receive a frame for channel allocation management between the network coordinator and a wireless device so that uncompressed isochronous data is transmitted via the data slot section 13. The frame for channel allocation management includes a frame for requesting addition of data slots, a frame requesting change of data slots, and a frame for returning data slots. In addition, the above-mentioned various control frames are transmitted/received via the control section 12.

The beacon and control sections 11 and 12 are used to transmit various frames at a low transmission rate. The data slot section 13 is used to transmit frames at a high or low transmission rate. The difference between high and low transmission rates may be based on the data modulation type.

A channel adapted for a high transmission rate is a unidirectional link, and is commonly used for the purpose of unicast connection and uncompressed isochronous data transmission. When a frame is transmitted at a high transmission rate, antenna steering technology may be used to improve the directionality. To this end, a frame having antenna steering information may be transmitted/received via the data slot section 13.

A channel adapted for a low transmission rate is a bidirectional link, and is commonly used for the purpose of unicast connection or broadcast connection. In addition, asynchronous data, various control frames, and antenna steering information may be transmitted/received via a data channel at a low transmission rate.

The beacon section 11 is used to transmit a beacon frame via a channel adapted for a low transmission rate, and the beacon frame is used for network time synchronization. The beacon frame contains information regarding channels allocated to respective devices, i.e., information regarding data slots.

The control section 12 is used to transmit/receive various MAC control frames via a channel adapted for a low transmission rate. The control frames include a control frame necessary for initialization, a control frame for channel allocation management, a control frame necessary to share antenna steering information, and an ACK frame.

The control frame necessary for initialization is used for channel switching and device discovery. The control frame for channel allocation management includes frames for adding, changing, and returning data slots.

The data slot section 13 is used to transmit/receive uncompressed isochronous data between devices via a channel adapted for a high transmission rate. For example, the uncompressed isochronous data may be real-time AV streaming data. In this case, a delay bound exists for the purpose of real-time AV streaming. The ACK frame and the antenna steering information may be transmitted/received via a channel adapted for a low transmission rate.

Figure 2C:
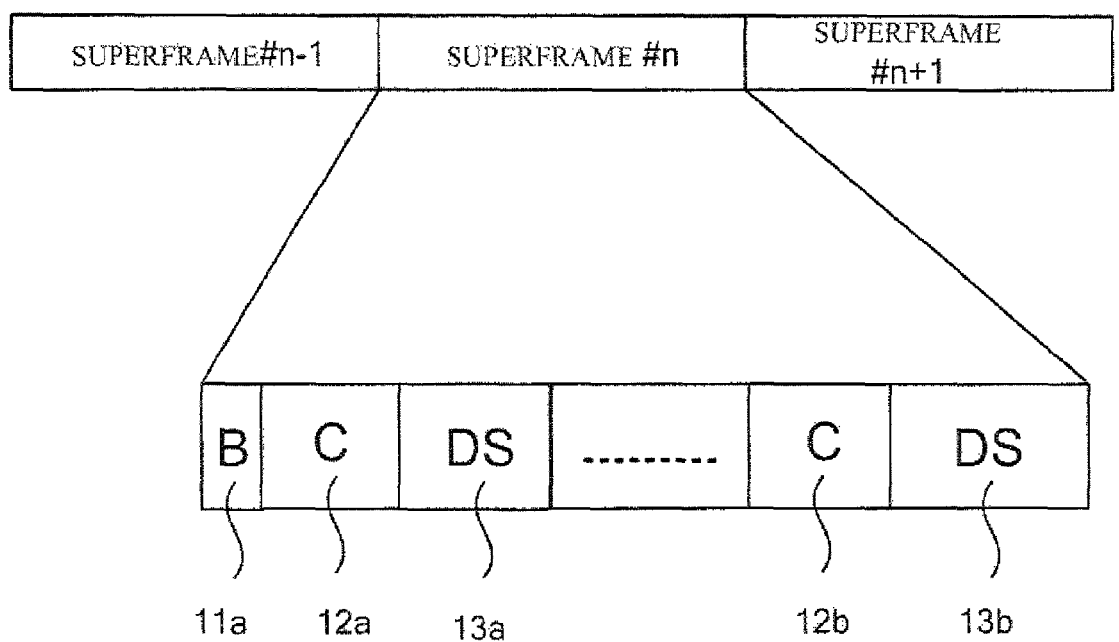
FIG. 2c shows a time division scheme according to another exemplary embodiment of the present invention.

FIG. 2c shows the structure of a superframe according to another exemplary embodiment of the present invention. Unlike the structure shown in FIG. 2b, a single superframe has a beacon section B 11*a*, at least two control sections C 12*a* and 12*b*, and data slot sections DS 13*a* and 13*b*.

Such a superframe structure ensures that, when a plurality of control sections and data slot sections are designated in a single superframe, it is possible to minimize the time delay phenomenon of isochronous data transmission, which may occur when a frame for data slot allocation fails to be transmitted via a specific control section.

Figure 3:
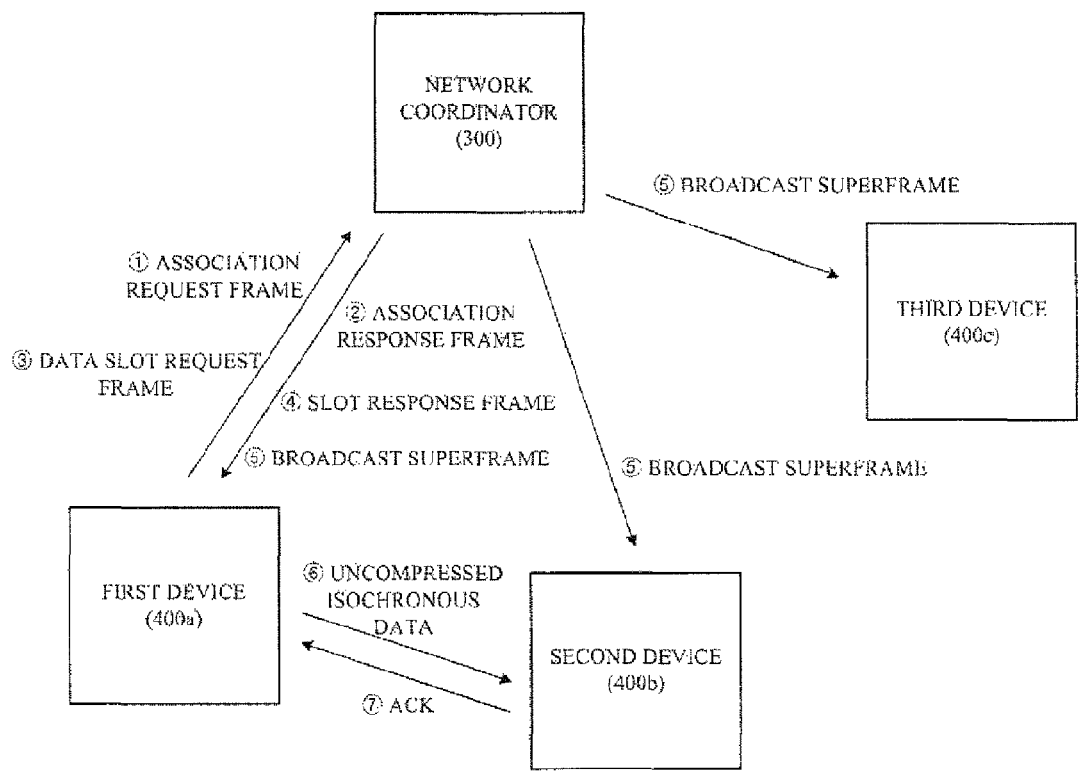
FIG. 3 briefly shows an environment to which the present invention is applied.

FIG. 3 briefly shows an environment to which the present invention is applied.

Referring to FIG. 3, a network coordinator 300 and at least one device 400*a*, 400*b*, and 400*c* constitute a single network. For example, the network coordinator 300 may be a display device as a sink device for AV data, or a media storage device such as a Personal Video Recorder (PVR). The devices 400*a*, 400*b*, and 400*c* may be source devices or sink devices, particularly a set-top box, a DVD, and a speaker. These devices employ a high-frequency band of tens of GHz so as to transmit uncompressed isochronous data.

The network coordinator 300 broadcasts a superframe periodically, i.e., for each beacon period. Based on the broadcasting, the devices 400*a*, 400*b*, and 400*c* can transmit control, data, and ACK frames within the control section 12 or the data slot section 13 included in the superframe.

When the first device 400*a* wants to participate in the network, although it has not participated initially, an association request frame is transmitted to the network coordinator 300 via the control section 12 of the superframe 10 while competing with other devices 400*b* and 400*c* (①), and an association response frame is received in response thereto (②).

After the association request of the first device 400*a* is accepted in response to the association response frame, the first device 400*a* becomes a member of the network. If the first device 400*a* wants to transmit uncompressed isochronous data to the second device 400*b*, the first device 400*a* must request the network coordinator 300 that a data slot for transmitting the uncompressed isochronous data be provided. When the first device 400*a* transmits such a data slot request frame to the network coordinator 300 via the control section 12 while competing with other devices 400*b* and 400*c* (③), the network coordinator 300 transmits a data slot response frame to the first device 400*a* (④).

After transmitting the data slot response frame 70 to the first device 400*a*, the network coordinator 300 broadcasts a superframe, including data slots allocated to the devices 400*a*, 400*b*, and 400*c*, for the next beacon period (⑤).

The network coordinator 300 allocates a data slot to the first device 400*a* based on the broadcasted superframe. Then, uncompressed isochronous data can be transmitted to a receiver device 400*b* during the allocated data slot (⑥). The second device 400*b* can transmit an ACK frame to the first device 400*b* in response to the transmitted uncompressed isochronous data (⑦). However, considering the characteristics of uncompressed isochronous data, some amounts of errors do not seriously affect played images. Therefore, the ACK frame is unnecessary, i.e., "No ACK policy" may be followed. Even when the ACK frame is transmitted, the ACK frame may not be transmitted via the data slot according to the present invention. In order to use the data slot for efficient transmission of uncompressed isochronous data, it is preferred to transmit the ACK frame competitively via the control section 12, as in the case of other control frames.

Figure 4:
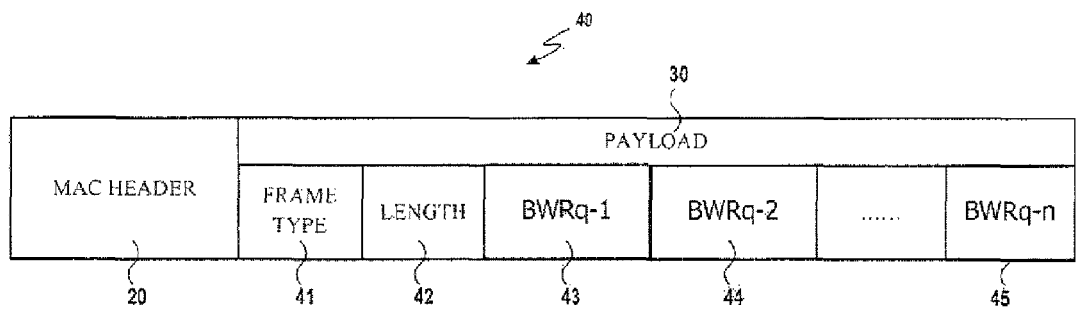

FIGS. 4, 5*a*, and 5*b* show the construction of data slot management slots according to exemplary embodiments of the present invention, respectively.

Referring to FIG. 4, a data slot management frame 40 according to an exemplary embodiment of the present invention includes an MAC header 20 and a payload 30, as in the case of other MAC control frames. The payload 30 includes a frame type field 41, a length field 42, and a plurality of data slot fields 43, 44, and 45.

The frame type field 41 keeps a record of identification information regarding whether the frame is for the purpose of adding, changing, or returning a data slot. In other words, information recorded in the frame type field 41 determines the type of the data slot management frame. The length field 42 keeps a record of the total byte number of following fields 43, 44, and 45.

The data slot management frame 40 includes a plurality of data slot fields 43, 44, and 45, each of which keeps a record of information regarding addition, change, or return of a data slot. This means that requests for addition, change, or return of a plurality of data slots for transmission of plural pieces of uncompressed isochronous data can be made simultaneously, and the data slot fields have a structure shown in FIGS. 5*a* and 5*b*.

Referring to FIG. 5*a*, the data slot fields include a 'Stream index' field 51, a 'Stream request ID' field 52, a 'Min_BW' field 53, a 'Number of time blocks' field 54, a 'Time block duration' field 55, a 'BWRateType' field 56, a 'BWRateFactor' field 57, and a 'Priority' field 58.

The 'Stream index' field 51 keeps a record of stream identification information, i.e., identification information regarding uncompressed isochronous data to be transmitted. The stream identification information is used to process the corresponding stream.

The 'Stream request ID' field 52 carries identification information regarding a frame for requesting addition, change, or return of a data slot which is used before the stream identification information is given. If the data slot requests that the current stream be modified or terminated, the value of the 'Stream request ID' field 52 is set to zero, and may be ignored by the receiving side.

The 'Min_BW' field 53 designates the minimum bandwidth which must be guaranteed within a superframe in order to support a seamless screaming service, i.e., the minimum channel length to be guaranteed.

The 'Number of time blocks' field 54 designates the number of requested time blocks in terms of their bandwidth, i.e., the desired channel length. When uncompressed isochronous data is to be transmitted, the 'Number of time blocks' field 54 designates the number of time blocks within a single superframe.

The 'Time block duration' field 55 designates the unit bandwidth, i.e., the length of a unit channel.

The 'BWRateType' field 56 indicates whether a period requesting channel allocation is repeated a number of times within a superframe or repeated once every a number of superframes. The 'BWRateFactor' field 57 indicates a specific period based on the information recorded in the 'BWRateType' field 56. The 'priority' field 58 defines the priority among frames, which corresponds to the QoS level of streams or that for a special purpose.

FIG. 5*b* shows the structure of a data slot field according to another exemplary embodiment of the present invention. The data slot field includes a 'TrgtID' field 50*a*, a 'Stream request ID' field 51*a*, a 'Stream index' field 52*a*, a 'Number of time blocks' field 53*a*, a 'Time block duration' field 54*a*, a 'Minimum Schedule period' field 55*a*, a 'Maximum Schedule period' field 56*a*, and a 'Request control' field 57*a*. Among them, the 'Stream request ID' field 51*a*, the 'Stream index' field 52*a*, the 'Number of time blocks' field 53*a*, and the 'Time block duration' field 54a are the same as the corresponding fields shown in FIG. 5a.

The 'TrgtID' field 50a carries identification information regarding a device, to which another device transmits uncompressed isochronous data via an allocated channel i.e., allocated data slot.

The 'Minimum Schedule period' field 55a designates the minimum time allowed between the beginning time of two consecutive time blocks for data slot allocation.

The 'Maximum Schedule period' field 56a designates the maximum time allowed between the beginning time of two consecutive time blocks for data slot allocation.

The 'Request control' field 57a contains information regarding other details for data slot allocation, including information regarding the priority among frames and information regarding whether frames are transmitted via a high or low transmission rate section.

Figure 7A:
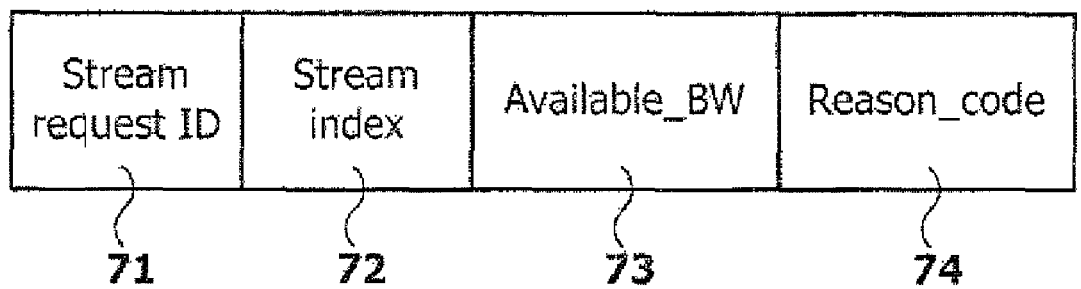
Figure 7B:
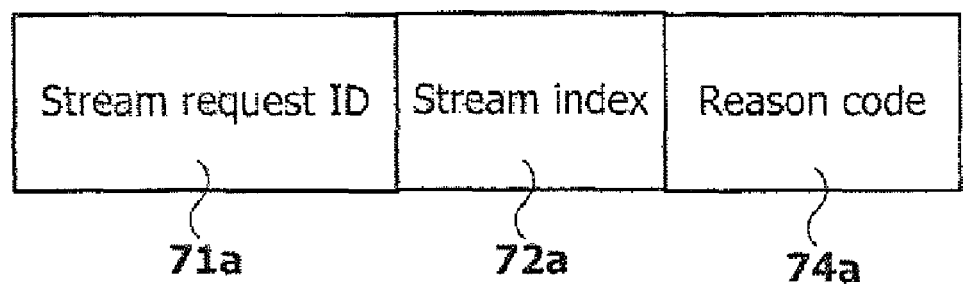

FIGS. 6, 7a, and 7b show the construction of response frames responding to data slot management frames according to exemplary embodiments of the present invention, respectively.

Referring to FIG. 6, a response frame 60 responding to a data slot management frame 40 according to an exemplary embodiment of the present invention includes an MAC header 20 and a payload 30 as in the case of other MAC control frames. The payload 30 includes a frame type field 61, a length field 62, and a plurality of response fields 63, 64, and 65.

The frame type field 61 keeps a record of identification information regarding whether the response frame responds to a request for addition, change, or return of a data slot. In other words, information recorded in the frame type field 61 determines the type of the response frame. The length field 62 keeps a record of the total byte number of following fields 63, 64, and 65.

The response frame 60 responding to the data slot management frame 40 includes a plurality of response fields 63, 64, and 65, each of which keeps a record of response information regarding addition, change, or return of a data slot. This means that responses to a plurality of requests can be made simultaneously, and the response fields have a structure shown in FIGS. 7a and 7b.

Referring to FIG. 7a, the response fields include a 'Stream request ID' field 71, a 'Stream index' field 72, an 'Available_BW' field 73, and a 'Reason_code' field 74.

The 'Stream request ID' field 71 contains identification information regarding a frame for requesting addition, change, or return of a data slot. The 'Stream index' field 72 contains stream identification information, i.e., identification information regarding corresponding uncompressed isochronous data.

The 'Available_BW' field 73 contains information regarding actually allocated channels, i.e., actually allocated data slots. The 'Reason_code' field 74 contains information regarding whether or not a channel allocation request has been successfully made. If the channel allocation request has not been successfully made, information regarding the reason is recorded. Such a failure of the channel allocation request occurs when the maximum number of devices that can be coupled to the network coordinator has been reached, when data slots that can be allocated are insufficient, or when the channel condition is poor.

FIG. 7b shows the structure of a response field according to another exemplary embodiment of the present invention. The response field includes a 'Stream request ID' field 71a, a 'Stream index' field 72a, and a 'Reason_code' field 74a. The 'Available_BW' field 73 shown in FIG. 7a is omitted.

The 'Stream request ID' field 71a, the 'Stream index' field 72a, and the 'Reason_code' field 74a correspond to the 'Stream request ID' field 71, the 'Stream index' field 72, and the 'Reason_code' field 74 shown in FIG. 7a, respectively.

Figure 8:
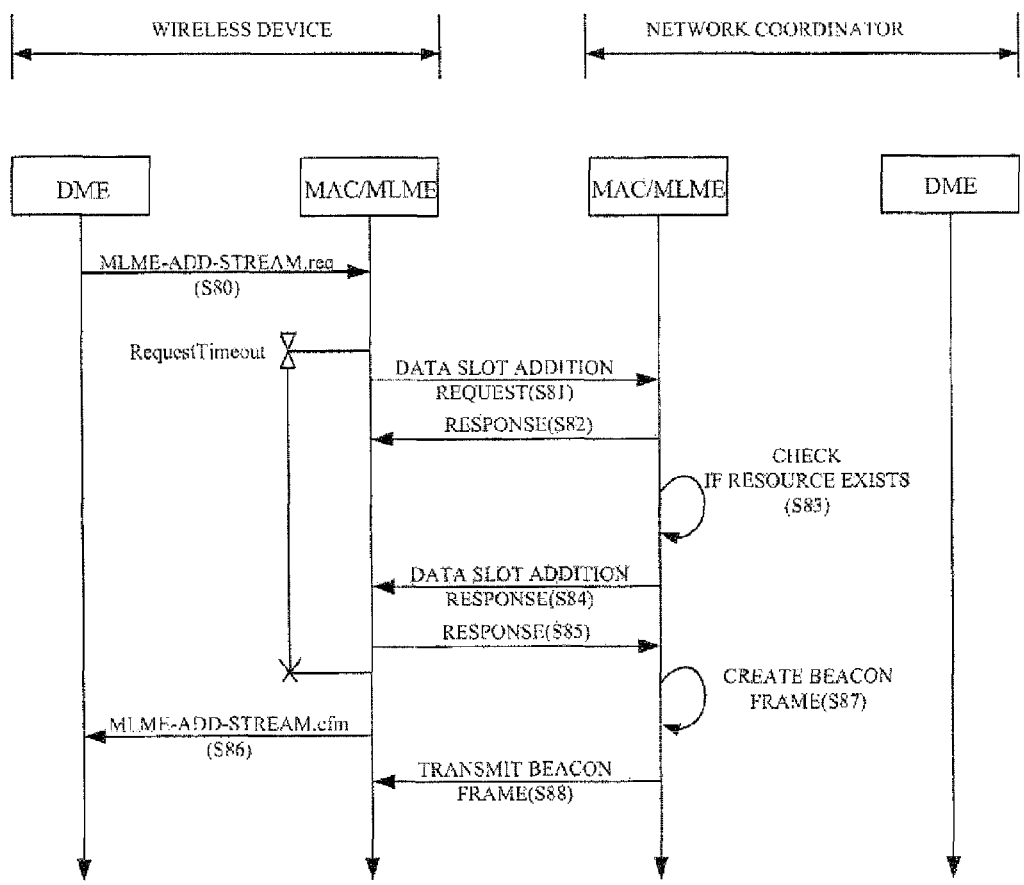
FIG. 8 shows a process for adding a data slot according to an exemplary embodiment of the present invention.

FIG. 8 shows a process for adding a data slot according to an exemplary embodiment of the present invention.

The Device Management Entity (DME) of a wireless device receives a transmission request of an upper layer, and calls an MLME-ADD-STREAM.req message of its MAC Layer Management Entity (MAC/MLME) via a control section 12 (S80). The MAC/MLME transmits a data slot addition request frame to the network coordinator (S81). The data slot addition request frame has the same data structure as shown in FIGS. 4 and 5. The DME and MLME should be understood based on concepts defined by IEEE 802.15.3 standards.

The MAC/MLME of the network coordinator transmits an ACK frame in response to the data slot addition request frame (S82). The data slot addition request frame and its response may be made concurrently with a request for various pieces of uncompressed isochronous data and its response, as shown in FIGS. 4 and 6.

The network coordinator checks remaining resources, i.e., confirms whether or not a data slot for transmitting uncompressed isochronous data exists (S83). The result of the check is transmitted to the wireless device in the data structure type shown in FIGS. 6 and 7 within a 'RequestTimeout' time (S84). The MAC/MLME of the wireless device transmits an ACK frame to the network coordinator in response to the transmitted result (S85).

If the MAC/MLME of the wireless devices receives a response informing that a data slot has been added successfully (S84), the MAC/MLME transmits an MLME-ADD-STREAM.cfm message to its DME so as to inform that a data slot has been added successfully (S86).

Considering that a beacon frame contains information regarding a data slot, steps S84 and S85 may be omitted. If no data slot can be added, a data slot addition request frame may be repeatedly transmitted after a predetermined period of time.

The MAC/MLME of the network coordinator creates a beacon frame containing information regarding the actually allocated data slot (S87), and transmits the created beacon frame to the MAC/MLME of the wireless device when the next superframe starts (S88).

After receiving the transmitted beacon frame, the wireless device transmits uncompressed isochronous data via the data slot, which has been added to the data slot section.

Depending on the MAC structure, operations conducted by the MAC/MLME of the network coordinator may be conducted by the DME of the network coordinator instead.

Figure 9:
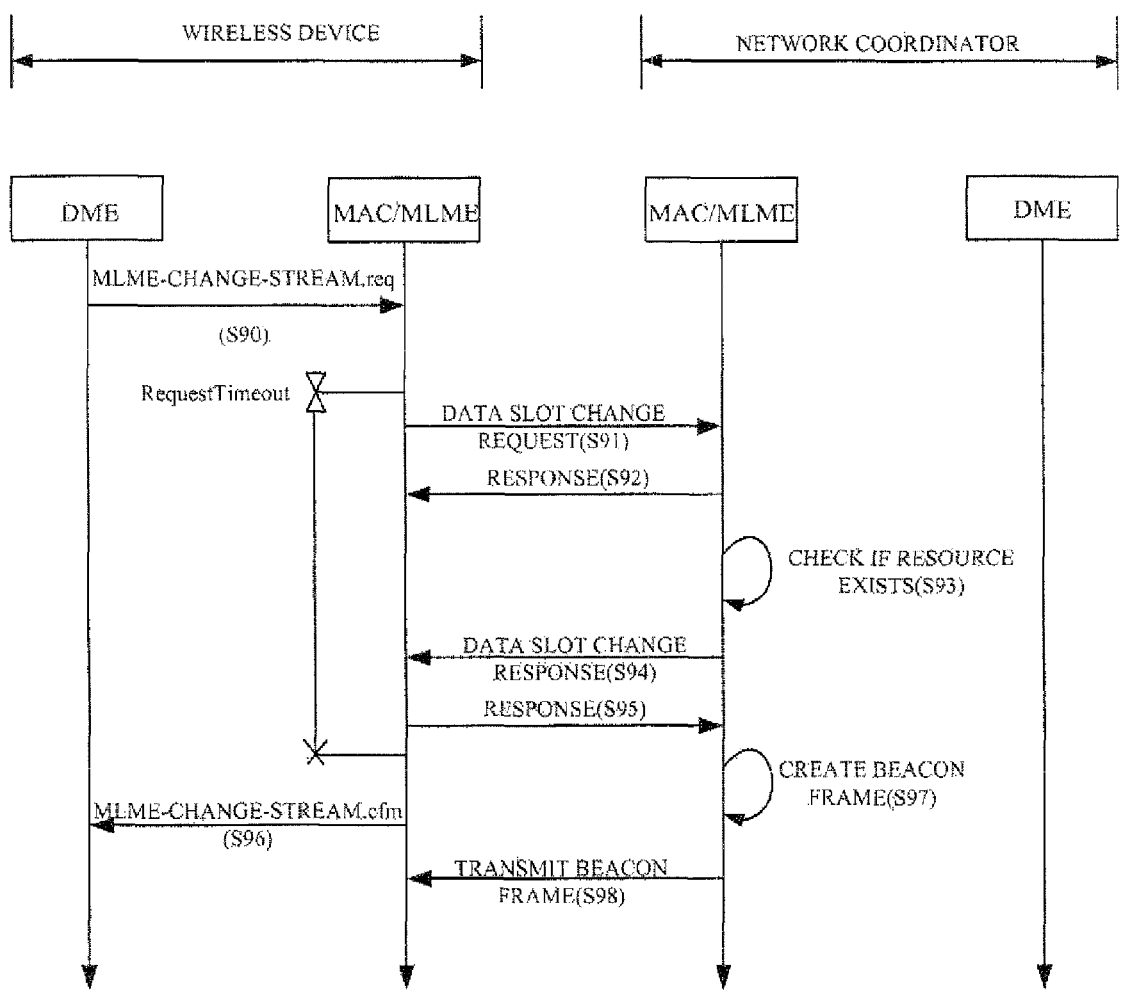
FIG. 9 shows a process for changing a data slot according to an exemplary embodiment of the present invention.

FIG. 9 shows a process for changing a data slot while uncompressed isochronous data is transmitted/received according to an exemplary embodiment of the present invention.

The DME of a wireless device receives a transmission request of an upper layer, and calls an MLME-CHANGE-STREAM.req message of its MAC/MLME via a control section 12 (S90). The MAC/MLME transmits a data slot change request frame to the network coordinator (S91). The data slot change request frame has the same data structure as shown in FIGS. 4 and 5. The DME and MLME should be understood based on concepts defined by IEEE 802.15.3 standards.

The MAC/MLME of the network coordinator transmits an ACK frame in response to the data slot change request frame (S92). The data slot change request frame and its response may be made concurrently with a request for various pieces of uncompressed isochronous data and its response, as shown in FIGS. 4 and 6.

Then, the network coordinator checks remaining resources, i.e., confirms whether or not a data slot for transmitting uncompressed isochronous data exists (S93). The result of the check is transmitted to the wireless device in the data structure type shown in FIGS. 6 and 7 within a 'Request-Timeout' time (S94). The MAC/MLME of the wireless device transmits an ACK frame to the network coordinator in response to the transmitted result (S95).

If the MAC/MLME of the wireless devices receives a response informing that a data slot has been changed successfully (S94), the MAC/MLME transmits an MLME-CHANGE-STREAM.cfm message to its DME so as to inform that a data slot has been changed successfully (S96).

Considering that a beacon frame contains information regarding a data slot, steps S94 and S95 may be omitted. If no data slot can be changed, a data slot change request frame may be repeatedly transmitted after a predetermined period of time.

The MAC/MLME of the network coordinator creates a beacon frame containing information regarding the actually allocated data slot (S97), and transmits the created beacon frame to the MAC/MLME of the wireless device when the next superframe starts (S98).

After receiving the transmitted beacon frame, the wireless device transmits uncompressed isochronous data via the changed data slot of the data slot section.

Depending on the MAC structure, operations conducted by the MAC/MLME of the network coordinator may be conducted by the DME of the network coordinator instead.

Figure 10:
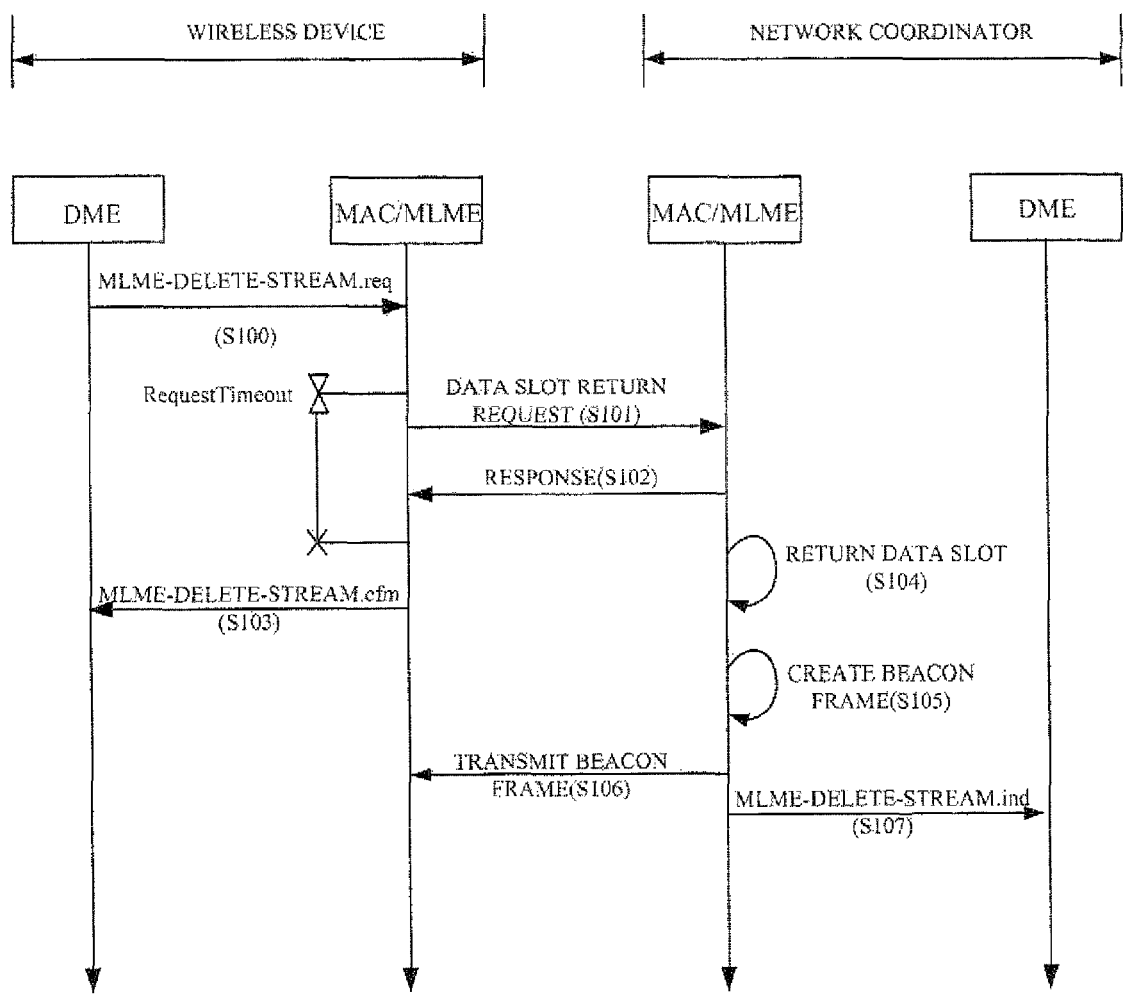
FIG. 10 shows a process for returning a data slot according to an exemplary embodiment of the present invention.

FIG. 10 shows a process for returning a data slot while uncompressed isochronous data is transmitted/received according to an exemplary embodiment of the present invention.

The DME of a wireless device receives a transmission request of an upper layer, and calls an MLME-DELETE-STREAM.req message of its MAC/MLME via a control section 12 (S100). The MAC/MLME transmits a data slot return request frame to the network coordinator (S101). The data slot return request frame has the same data structure as shown in FIGS. 4 and 5. The DME and MLME should be understood based on concepts defined by IEEE 802.15.3 standards.

The MAC/MLME of the network coordinator transmits an ACK frame in response to the data slot return request frame (S102). The data slot return request frame and its response may be made concurrently with a request for various pieces of uncompressed isochronous data and its response, as shown in FIGS. 4 and 6.

The MAC/MLME of the wireless device transmits an MLME-DELETE-STREAM.cfm message to its DME so as to inform that the data slot has been successfully returned (S103). The MAC/MLME of the network coordinator returns the corresponding data slot (S104), creates a beacon frame containing information regarding the actually returned data slot (S105), and transmits the created beacon frame to the MAC/MLME of the wireless device when the next superframe starts (S106).

As such, the returned data slot can be allocated again at the request of another wireless device and be used to transmit uncompressed isochronous data.

In addition, the MAC/MLME of the network coordinator transmits an MLME-DELETE-STREAM.ind message to its DME so as to inform that the requested data slot has been returned (S107).

Figure 11:
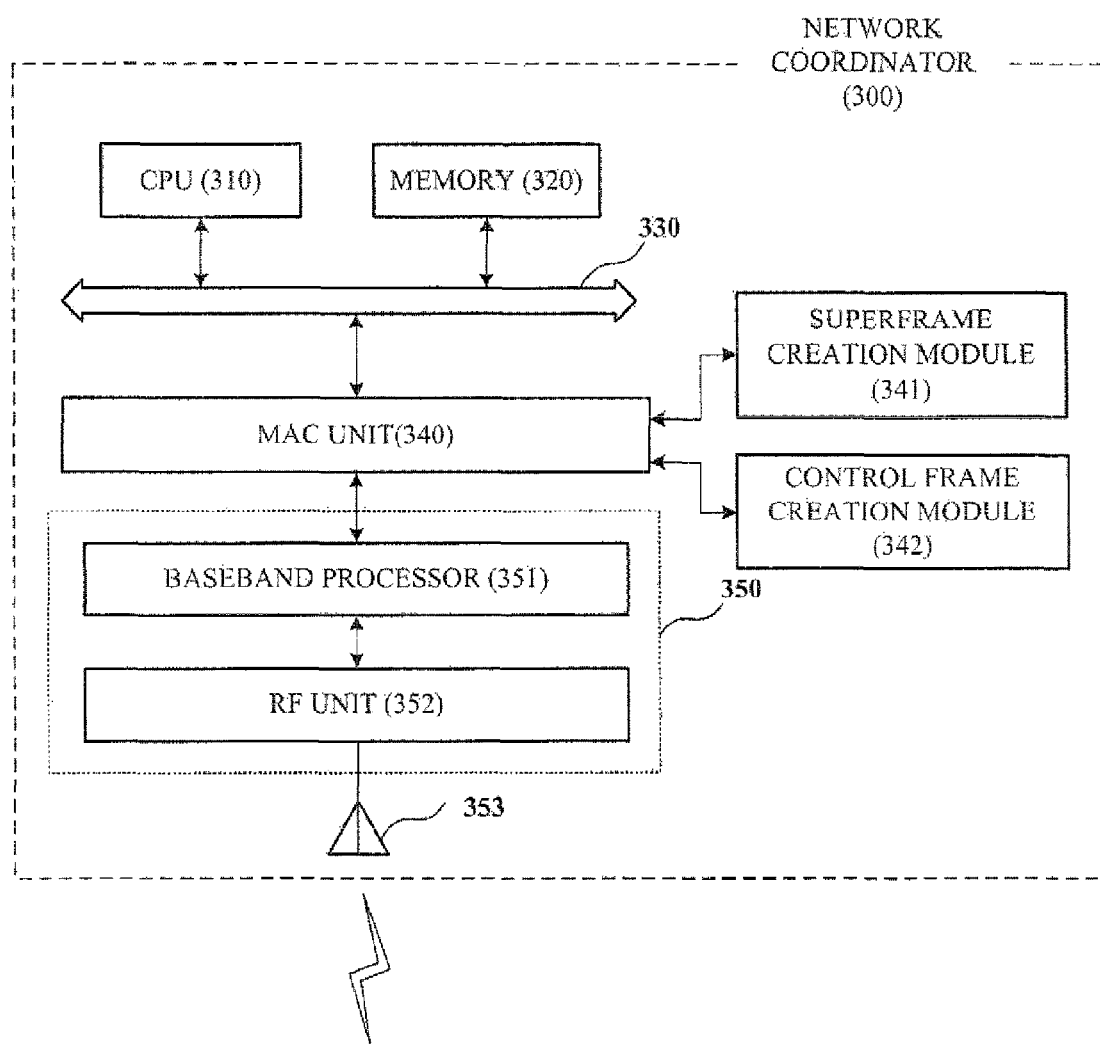
FIG. 11 shows the construction of a network coordinator according to an exemplary embodiment of the present invention.

FIG. 11 is a block diagram showing the construction of a network coordinator 300 according to an exemplary embodiment of the present invention.

The network coordinator 300 includes a CPU 310, a memory 320, an MAC unit 340, a PHY unit 350, a superframe creation module 341, a control frame creation module 342, and an antenna 353.

The CPU 310 controls other components connected to a bus 330, and is in charge of processing on the upper layer of the MAC layer. Particularly, the CPU 310 processes reception data, i.e., reception MSDU (MAC Service Data Unit), provided by the MAC unit 340, or creates transmission data (transmission MSDU), which is provided to the MAC unit 340.

The memory 320 stores the processed reception data or temporarily stores the created transmission data. The memory may consist of a non-volatile memory device (e.g., ROM, PROM, EPROM, EEPROM, flash memory), a volatile memory device (e.g., RAM), a storage medium (e.g., hard disk, optical disk), or anther type of device widely known in the art.

The MAC unit 340 adds an MAC header to the MSDU (i.e., multimedia data to be transmitted) provided by the CPU 310 so as to create an MPDU (MAC Protocol Data Unit), which is transmitted via the PHY unit 350. The MAC unit 340 removes the MAC header from the MPDU received via the PHY unit 350.

As such, the MPDU transmitted by the MAC unit 340 includes a superframe transmitted for the beacon period. The MPDU received by the MAC unit 340 includes an association request frame, a data slot management frame (i.e., frame for requesting addition, change, or return of a data slot), and other types of control frames.

The superframe creation module 341 creates a superframe, as mentioned above, and provides the MAC unit 340 with it. The control frame creation module 342 creates an association request frame, a data slot management frame, and other types of control frames and provides them to the MAC unit 340.

The PHY unit 350 adds a signal field and a preamble to the MPDU provided by the MAC unit 340 so as to create a PPDU (i.e., data frame), which is converted into a wireless signal and transmitted via the antenna 353. The PHY unit 350 may include a baseband processor 351 for processing baseband signals and an RF (Radio Frequency) unit 352 for creating actual wireless signals from the processed baseband signals and transmitting them into the air via the antenna 353.

More particularly, the baseband processor 351 conducts frame formatting, channel coding, etc. The RF unit 352 conducts analog wave amplification, analog/digital signal conversion, modulation, etc.

Figure 12:
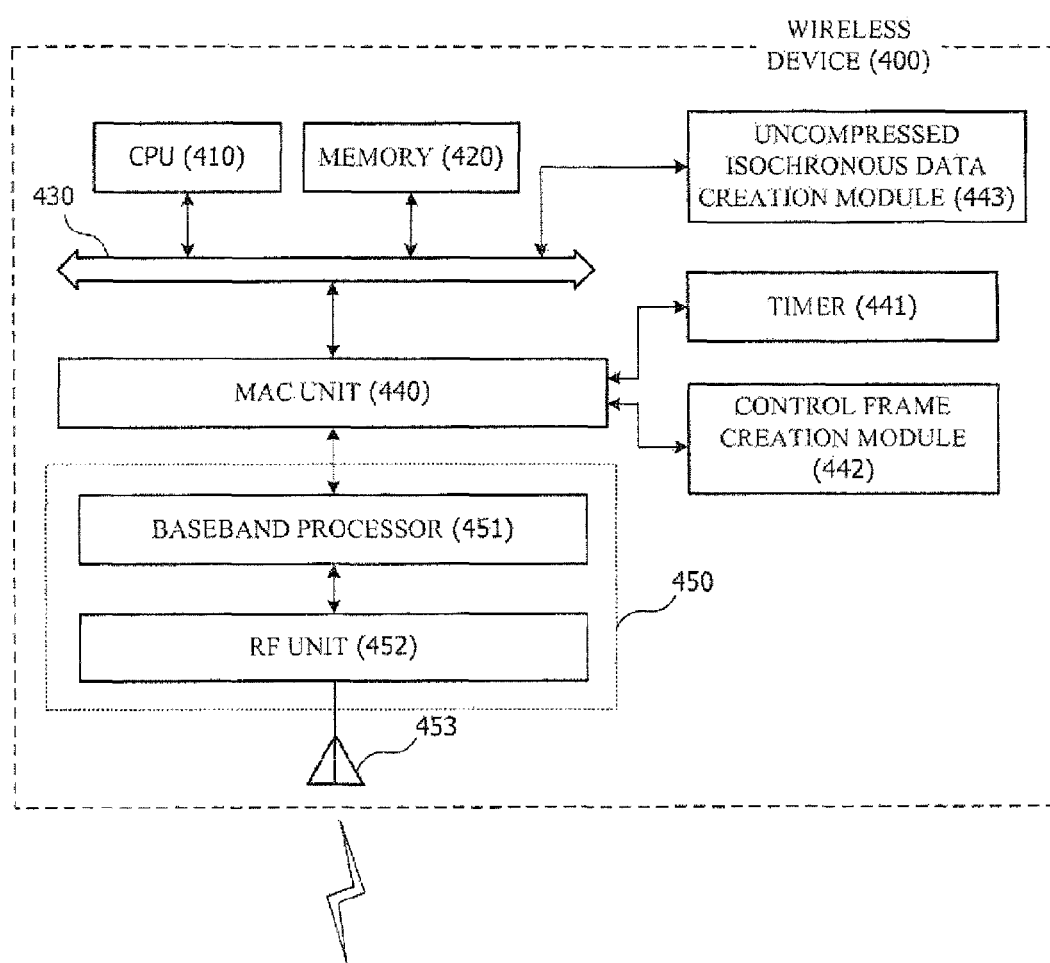
FIG. 12 shows the construction of a wireless device according to an exemplary embodiment of the present invention.

FIG. 12 is a block diagram showing the construction of a wireless device 400 according to an exemplary embodiment of the present invention. Among components of the wireless device 400, the MAC unit 440, the memory 420, and the PHY unit 450 have the same basic function as in the case of the network coordinator 300.

The timer 441 is used to determine when a competitive or uncompetitive section included in the superframe starts and ends. The control frame creation module 442 creates an association request frame, a data slot management frame, and other types of control frames and provides them to the MAC unit 440.

The uncompressed isochronous data creation module 443 records and creates isochronous data (e.g., AV data) in an uncompressed type. For example, the uncompressed isochronous data creation module 443 may record video data including RGB component values of the video data.

The MAC unit 440 adds an MAC header to provided uncompressed isochronous data or to a control frame so as to create an MPDU, which is transmitted via the PHY unit 450 when the corresponding time of the superframe arrives.

As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules. In addition, the elements and modules may be implemented to play at least one CPU inside a device or a security multimedia card.

As mentioned above, the present invention is advantageous in that, by providing a function for adding, changing, or returning a data slot for uncompressed isochronous data transmission, uncompressed isochronous data can be transmitted more efficiently via a band of tens of GHz.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the exemplary embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. A method of managing channel allocation for uncompressed isochronous data transmission, the method comprising:
    broadcasting a first superframe for a first beacon period, the first superframe comprising a control section and a data slot section;
    receiving a request frame from at least one wireless device belonging to a network via the control section, the request frame requesting additions of data slots for transmission of uncompressed isochronous data;
    transmitting a response frame to the at least one wireless device via the control section in response to the request frame; and
    broadcasting a second superframe for a second beacon period, the second superframe comprising information regarding data slots added to the at least one wireless device,
    wherein the request frame comprises a plurality of first fields, each of which keeps a record of information regarding addition of a data slot, the response frame comprises a plurality of second fields, each of which keeps a record of response information regarding addition of a data slot,
    wherein each of the second fields of the response frame comprises information regarding a reason the requested data slot fails to be added if the requested data slot fails to be added.

2. The method of claim 1, wherein communication with the at least one wireless device is conducted via a millimeter wave channel.

3. The method of claim 1, wherein each of the first and second superframes comprises a competitive section and an uncompetitive section, the competitive section comprises the control section, and the uncompetitive section comprises the data slot section.

4. The method of claim 1, wherein each of the first fields of the request frame comprises at least one of identification information regarding the uncompressed isochronous data to be transmitted, identification information regarding the request frame, information regarding a minimum channel length to be guaranteed, and information regarding a cycle, transmission of the request frame being repeated at the cycle in the superframe.

5. The method of claim 1, wherein each of the second fields of the response frame further comprises at least one of identification information regarding the uncompressed isochronous data to be transmitted, identification information regarding the request frame, and information regarding an actually added data slot.

6. A method of transmitting uncompressed isochronous data, the method comprising:
    receiving a first superframe from a network coordinator for a first beacon period, the first superframe comprising a control section and a data slot section;
    transmitting a request frame to the network coordinator within the control section, the request frame requesting additions of data slots for transmission of uncompressed isochronous data;
    receiving a response frame from the network coordinator within the control section in response to the request frame;
    receiving a second superframe from the network coordinator for a second beacon period, the second superframe comprising information regarding added data slots; and
    transmitting the uncompressed isochronous data to a wireless device via the added data slots,
    wherein the request frame comprises a plurality of first fields, each of which keeps a record of information regarding addition of a data slot, the response frame comprises a plurality of second fields, each of which keeps a record of response information regarding addition of a data slot,
    wherein each of the second fields of the response frame comprises information regarding a reason the requested data slot fails to be added if the requested data slot fails to be added.

7. The method of claim 6, wherein communication with the at least one wireless device is conducted via a millimeter wave channel.

8. The method of claim 6, wherein each of the first and second superframes comprises a competitive section and an uncompetitive section, the competitive section comprises the control section, and the uncompetitive section comprises the data slot section.

9. The method of claim 6, wherein each of the first fields of the request frame comprises at least one of identification information regarding the uncompressed isochronous data to be transmitted, identification information regarding the request frame, information regarding a minimum channel length to be guaranteed, and information regarding a cycle, transmission of the request frame being repeated at the cycle in the superframe.

10. A method of managing channel allocation for uncompressed isochronous data transmission, the method comprising:

broadcasting a first superframe for a first beacon period, the first superframe comprising a control section and a data slot section;

receiving a request frame from at least one wireless device belonging to a network via the control section, the request frame requesting changes of data slots for transmission of uncompressed isochronous data;

transmitting a response frame to the at least one wireless device via the control section in response to the request frame; and broadcasting a second superframe for a second beacon period, the second superframe comprising information regarding the data slots changed as requested by the at least one wireless device, wherein the request frame comprises a plurality of first fields, each of which keeps a record of information regarding addition of a data slot, the response frame comprises a plurality of second fields, each of which keeps a record of response information regarding addition of a data slot wherein each of the second fields of the response frame comprises information regarding a reason the requested data slot fails to be added if the requested data slot fails to be added.

11. The method of claim 10, wherein communication with the at least one wireless device is conducted via a millimeter wave channel.

12. The method of claim 10, wherein each of the first and second superframes comprises a competitive section and an uncompetitive section, the competitive section comprises the control section, and the uncompetitive section comprises the data slot section.

13. The method of claim 10, wherein each of the first fields of the request frame comprises at least one of identification information regarding the uncompressed isochronous data to be transmitted, identification information regarding the request frame, information regarding a minimum channel length to be guaranteed, and information regarding a cycle, transmission of the request frame being repeated at the cycle in the superframe.

14. The method of claim 10, wherein each of the second fields of the response frame further comprises at least one of identification information regarding the uncompressed isochronous data to be transmitted, identification information regarding the request frame, and information regarding an actually changed data.

15. A method of transmitting uncompressed isochronous data, the method comprising:

receiving a first superframe from a network coordinator for a first beacon period, the first superframe comprising a control section and a data slot section;

transmitting a request frame to the network coordinator within the control section, the request frame requesting changes of data slots for transmission of uncompressed isochronous data;

receiving a response frame from the network coordinator within the control section in response to the request frame;

receiving a second superframe from the network coordinator for a second beacon period, the second superframe comprising information regarding changed data slots; and transmitting the uncompressed isochronous data to a wireless device via the changed data slot section, wherein the request frame comprises a plurality of first fields, each of which keeps a record of information regarding addition of a data slot, the response frame comprises a plurality of second fields, each of which keeps a record of response information regarding addition of a data slot wherein each of the second fields of the response frame comprises information regarding a reason the requested data slot fails to be added if the requested data slot fails to be added.

16. The method of claim 15, wherein communication with the at least one wireless device is conducted via a millimeter wave channel.

17. The method of claim 15, wherein each of the first and second superframes comprises a competitive section and an uncompetitive section, the competitive section comprises the control section, and the uncompetitive section comprises the data slot section.

18. The method of claim 15, wherein each of the first fields of the request frame comprises at least one of identification information regarding the uncompressed isochronous data to be transmitted, identification information regarding the request frame, information regarding a minimum channel length to be guaranteed, and information regarding a cycle, transmission of the request frame being repeated at the cycle in the superframe.

19. A method of managing channel allocation for uncompressed isochronous data transmission, the method comprising:

broadcasting a first superframe for a first beacon period, the first superframe comprising a control section and a data slot section;

receiving a request frame from at least one wireless device belonging to a network via the control section, the request frame requesting return of a data slot for uncompressed isochronous data transmission;

transmitting a response frame to the at least one wireless device via the control section in response to the request frame; and broadcasting a second superframe for a second beacon period, the second superframe comprising information regarding the data slot returned to the at least one wireless device, wherein the request frame comprises a plurality of first fields, each of which keeps a record of information regarding addition of a data slot, the response frame comprises a plurality of second fields, each of which keeps a record of response information regarding addition of a data slot, wherein each of the second fields of the response frame comprises information regarding a reason the requested data slot fails to be added if the requested data slot fails to be added.

20. The method of claim 19, wherein communication with the at least one wireless device is conducted via a millimeter wave channel.

21. The method of claim 19, wherein each of the first and second superframes comprises a competitive section and an uncompetitive section, the competitive section comprises the control section, and the uncompetitive section comprises the data slot section.

22. An apparatus for allocating a data slot for uncompressed isochronous data transmission, the apparatus comprising:
- a unit broadcasting a first superframe for a first beacon period, the first superframe comprising a control section and a data slot section;
- a unit receiving a request frame from at least one wireless device belonging to a network within the control section, the request frame requesting additions of data slots for transmission of uncompressed isochronous data;
- a unit transmitting a response frame to the at least one wireless device within the control section in response to the frame; and
- a unit broadcasting a second superframe for a second beacon period, the second superframe comprising information regarding the data slots added to the at least one wireless device,
- wherein the request frame comprises a plurality of first fields, each of which keeps a record of information regarding addition of a data slot, the response frame comprises a plurality of second fields, each of which keeps a record of response information regarding addition of a data slot,
- wherein each of the second fields of the response frame comprises information regarding a reason the requested data slot fails to be added if the requested data slot fails to be added.

23. An apparatus for allocating a data slot for uncompressed isochronous data transmission, the apparatus comprising: a unit broadcasting a first superframe for a first beacon period, the first superframe comprising a control section and a data slot section;
- a unit receiving a request frame from at least one wireless device belonging to a network within the control section, the request frame requesting changes of data slots for transmission of uncompressed isochronous data;
- a unit transmitting a response frame to the at least one wireless device within the control section in response to the frame; and
- a unit broadcasting a second superframe for a second beacon period, the second superframe comprising information regarding the data slots changed as requested by the at least one wireless device,
- wherein the request frame comprises a plurality of first fields, each of which keeps a record of information regarding addition of a data slot, the response frame comprises a plurality of second fields, each of which keeps a record of response information regarding addition of a data slot,
- wherein each of the second fields of the response frame comprises information regarding a reason the requested data slot fails to be added if the requested data slot fails to be added.

24. An apparatus for allocating a data slot for uncompressed isochronous data transmission, the apparatus comprising:
- a unit broadcasting a first superframe for a first beacon period, the first superframe comprising a control section and a data slot section;
- a unit receiving a request frame from at least one wireless device belonging to a network within the control section, the request frame requesting returns of data slots for transmission of uncompressed isochronous data;
- a unit transmitting a response frame to the at least one wireless device within the control section in response to the frame; and
- a unit broadcasting a second superframe for a second beacon period, the second superframe containing information regarding the data slots returned to the at least one wireless device,
- wherein the request frame comprises a plurality of first fields, each of which keeps a record of information regarding addition of a data slot, the response frame comprises a plurality of second fields, each of which keeps a record of response information regarding addition of a data slot,
- wherein each of the second fields of the response frame comprises information regarding a reason the requested data slot fails to be added if the requested data slot fails to be added.

25. An apparatus for transmitting uncompressed isochronous data, the apparatus comprising:
- a unit receiving a first superframe from a network coordinator for a first beacon period, the first superframe comprising a control section and a data slot section;
- a unit transmitting a request frame to the network coordinator within the control section contained in the first superframe, the request frame requesting additions of a data slots for transmission of uncompressed isochronous data;
- a unit receiving a second superframe from the network coordinator for a second beacon period, the second superframe comprising information regarding the added data slots, and
- a unit transmitting the uncompressed isochronous data to a wireless device via the added data slots,
- wherein the request frame comprises a plurality of first fields, each of which keeps a record of information regarding addition of a data slot, the response frame comprises a plurality of second fields, each of which keeps a record of response information regarding addition of a data slot,
- wherein each of the second fields of the response frame comprises information regarding a reason the requested data slot fails to be added if the requested data slot fails to be added.

26. An apparatus for transmitting uncompressed isochronous data, the apparatus comprising:
- a unit receiving a first superframe from a network coordinator for a first beacon period, the first superframe comprising a control section and a data slot section;
- a unit transmitting a request frame to the network coordinator within the control section contained in the first superframe, the request frame requesting changes of data slots for transmission of uncompressed isochronous data;
- a unit receiving a second superframe from the network coordinator for a second beacon period, the second superframe comprising information regarding the changed data slots, and
- a unit transmitting the uncompressed isochronous data to a wireless device via the changed data slots,
- wherein the request frame comprises a plurality of first fields, each of which keeps a record of information regarding addition of a data slot, the response frame comprises a plurality of second fields, each of which keeps a record of response information regarding addition of a data slot,
- wherein each of the second fields of the response frame comprises information regarding a reason the requested data slot fails to be added if the requested data slot fails to be added.

27. A method of transmitting uncompressed isochronous data, the method comprising:
- receiving a request frame from at least one device connected to a network via a first beacon section, the request frame requesting isochronous data transmission;
- transmitting a response frame to the device connected to the network in response to the request frame; and
- transmitting uncompressed isochronous data to the device connected to the network based on the response frame,
- wherein the request frame comprises a plurality of first fields, each of which keeps a record of information regarding addition of a data slot, the response frame comprises a plurality of second fields, each of which keeps a record of response information regarding addition of a data slot,
- wherein each of the second fields of the response frame comprises information regarding a reason the requested data slot fails to be added if the requested data slot fails to be added.

28. The method of claim 27, wherein each of the first fields of the request frame comprises identification information regarding isochronous data to be transmitted, identification information regarding the request frame, and channel information regarding a requested channel.

29. The method of claim 28, wherein the channel information comprises information regarding a requested channel number, information regarding a unit channel length, information regarding a minimum period of time allowed between beginning of two consecutive time blocks for data slot allocation, and information regarding a maximum period of time allowed between beginning of two consecutive time blocks for data slot allocation.

30. The method of claim 27, wherein the request frame comprises identification information regarding a device receiving the uncompressed isochronous data.

31. The method of claim 27, wherein each of the second fields of the response frame further comprises at least one of identification information regarding the uncompressed isochronous data, identification information regarding the request frame, and information regarding whether or not a channel allocation request has been successfully made.

* * * * *